United States Patent [19]
Dean

[11] Patent Number: 4,548,485
[45] Date of Patent: Oct. 22, 1985

[54] READING DEVICE FOR THE VISUALLY HANDICAPPED

[76] Inventor: Stewart Dean, P.O. Box 120, Lake Hill, N.Y. 12448

[21] Appl. No.: 528,527

[22] Filed: Sep. 1, 1983

[51] Int. Cl.[4] ............................................. G03B 21/06
[52] U.S. Cl. ........................................ 353/67; 353/65; 353/81
[58] Field of Search ........................ 353/67, 66, 65, 63, 353/81, 97, 79; 350/508, 576, 301

[56] References Cited

U.S. PATENT DOCUMENTS

| Re. 28,274 | 12/1974 | Altman | 353/65 |
|---|---|---|---|
| 2,271,296 | 1/1942 | Hargrave et al. | 353/81 |
| 2,711,669 | 6/1955 | Erban | 353/67 |
| 2,937,569 | 5/1960 | Wilton | 353/81 |
| 3,679,299 | 7/1972 | Burgess et al. | 353/67 |
| 3,817,613 | 6/1974 | Cinque | 353/67 |
| 4,185,901 | 1/1980 | Behr | 353/81 |

FOREIGN PATENT DOCUMENTS 1117319  11/1961  Fed. Rep. of Germany ........ 353/67

Primary Examiner—Charles Frankfort
Assistant Examiner—Thomas B. Will
Attorney, Agent, or Firm—Brooks Haidt Haffner & Delahunty

[57] ABSTRACT

An optical viewing device enabling visually handicapped persons to read ordinary textual material in full color, the device comprising a stage for holding the material and an X-Y positioner used to move the textual material on the stage; lights beneath the stage for illuminating the material; an objective to form a real image; a prism or mirrors for reflecting the imaging rays from the objective through 90 degrees and for reinverting the rays; two mirrors to reflect the rays to an approximately vertical, directional, controlled brightness rear projection screen, so that the imaging rays successively passing from the objective to the reflecting/reinverting prism or mirrors and the two mirrors form a real, erect enlarged image on the screen.

15 Claims, 5 Drawing Figures

READING DEVICE FOR THE VISUALLY HANDICAPPED

BACKGROUND OF THE INVENTION

This invention relates to optical viewing devices for the visually handicapped, and more particularly, it relates to apparatus which permits visually handicapped people to read ordinary textual materials.

A wide variety of devices is used to project images of transparent or opaque materials and of various artifacts so that an enlargement of the original is perceived. Thus, Erban U.S. Pat. No. 2,711,669 shows a projection apparatus for providing images of reduced materials on a viewing screen. The Erban device is used to view specially prepared microscopic reproductions of printed material onto a viewing screen. Another example of a device for viewing specially prepared microscopic opaque materials is shown in Erban U.S. Pat. No. 3,354,775, and devices for viewing transparencies are well known, as exemplified by Hopkins U.S. Pat. Nos. 2,322,023 and 2,937,569. A device for greatly enlarging profiles of physical optics is exemplified in Bausch et al U.S. Pat. No. 2,064,368.

The foregoing apparatus are not suited for viewing ordinary textual materials. They require additional steps to prepare a special copy.

The desirability of machines for reading ordinary materials has, of course, been recognized. One approach to the problem, Frank et al U.S. Pat. No. 2,720,136, shows a projector which rests on top of a book or other textual material. While permitting the enlargement of such ordinary material, this device does not produce a very bright or a very greatly enlarged image on the screen. Moreover, it requires that the entire head be raised and lowered on the material, and it can be difficult conveniently to move the textual material so that a line can be readily scanned. One approach to overcoming the disadvantages of the foregoing projector is shown in Cinque U.S. Pat. No. 3,817,613. In Cinque the head is no longer in contact with the material to be read, since a vertically moveable head is utilized. Unfortunately, in practical use this device exhibits a number of deficiencies which appear to have deterred its acceptance. The fact that the head is vertically displaceable means that either a long focus imaging lens must be used with the consequent production of a dimmer image or, alternatively, the distance between the short focus, high aperture objective and the material is quite critical. This causes the need for considerable adjustment as pages are turned, or simply as one page does not lie as flat in the plane as a preceding page. Moreover, the lamp housing containing the illumination means is disposed toward the user, with the concomitant necessity for protecting the user from heated surfaces.

Another approach to the provision of useful viewing devices is shown in Swiss Pat. No. 250,695. This device does not produce a very large image, and the placement of the textual material is awkward. In another approach to assist visually handicapped persons, a closed circuit television system has been used. The television monitor can be adjusted to give a fairly high-contrast enlarged image, and with some modern techniques, an image can be obtained without the need for extremely high intensity lighting. Unfortunately, such systems as are presently available are relatively high-cost and they require considerable and relatively expensive maintenance in use. Further, if it is required to reproduce text or illustrations in color, the cost and maintenance problems are very considerably more expensive than even a monochrome system.

Other art showing approaches to reproducing transparencies or opaque materials or to positioning materials for projection are shown in Brietzke U.S. Pat. No. 2,685,227; Draeger U.S. Pat. No. 2,163,593; Degnan U.S. Pat. No. 2,556,871, and Hanks U.S. Pat. No. 1,821,341.

All of the opaque viewing apparatus up to the present have lacked a combination of ready manipulation of the textual material, low cost, ease of construction and maintenance, and, very importantly, high brilliance and magnification so that persons with impaired vision can readily perceive the images. There is accordingly a need for some system which will permit visually handicapped persons to have convenient access to materials ordinarily read without difficulty by a person of normal vision.

THE INVENTION

Accordingly, the present invention provides an optical viewing apparatus which provides clear, sharp, high-contrast images of ordinary textual materials. The apparatus disclosed herein can be constructed largely with standard components, and hence, both initial and operating costs are minimized. Moreover, all of these desirable objectives are attained with a device which is easy to set up and use, and requires minimal instruction and familiarization.

Briefly, the present invention provides an optical, as opposed to electronic, viewing device which makes it possible for a visually handicapped person to have access to and readily read ordinary materials. The device itself comprises a substantially horizontal stage for holding ordinary textual materials; means for moving the material on the stage so that different areas can be viewed; means for illuminating the textual material on the stage; an objective to provide a real image of the material held on the stage; means for reflecting the imaging rays through an angle of about 90 degrees and reinverting the rays; a first substantially planar reflecting surface; a second substantially planar reflecting surface; and a substantially vertical, directional, controlled brightness rear-projection viewing screen upon which the real image is formed. The imaging rays formed by the objective pass from the reflecting means successively to the first and second planar surfaces to form the enlarged real image on the screen. This projection provides an erect, unreverted image.

This invention is further described herein by reference to the accompanying drawings, wherein FIG. 1 shows a side elevation, partly in section, of one form of device according to the invention;

One of the features provided by the device of the present invention is its relatively lighter weight than a television system providing the same image size, and printed material can be read without the "blooming" and resultant loss of resolution encountered when high-contrast images are obtained by television. Moreover, the television system requires more training for use, and of course, entails considerably more complicated maintenance requirements.

It will be understood in connection with the description of the present invention that the term "ordinary textual material" includes the sort of reading material which could be read by a person with good vision. It includes not only printed materials such as books, periodicals and pamphlets, but also diagrams, black and white and color photographs, magazine illustrations, cartoons, and the like. The device can also be used to read instructions, handwritten notes, and sketches. It can also be conveniently used by a visually handicapped person to ascertain that an envelope has been properly addressed or that the correct spaces are being utilized on forms.

The device of the present invention presents to the viewer bright, full color enlarged images of extreme sharpness. The general range of magnification is from about 5 to about 25 or 30 diameters, and in preferred embodiments is from about 8 to about 25 diameters. As presently embodied, the device of this invention can present an image of at least 40 candles/ft$^2$, and its resolution is at least a minimum desirable figure of 200 lines/inch. In fact, the device generally presents an image having a resolution of 250 or more lines/inch of original, or unenlarged, textual material.

Figure 1:
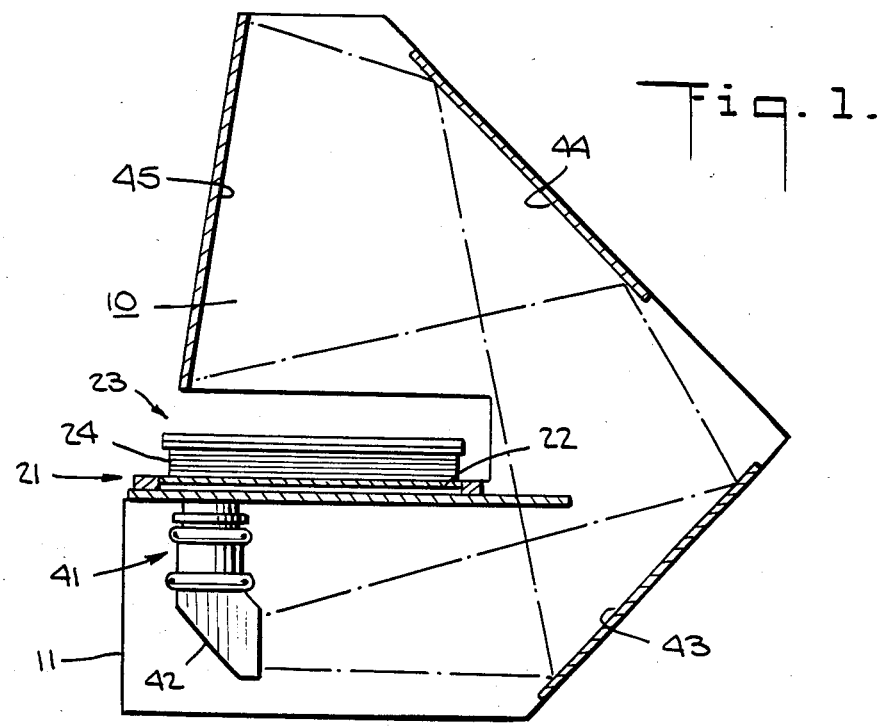

Turning to the drawings, FIG. 1 shows a side elevational view of viewing device 10. A book, journal, newspaper, or other reading material or flat subject for macro examination is placed face down on an X-Y positioning carrier 21 over transparent pane 22. In the illustration of FIG. 1, book 23 is shown as the textual material.

Figure 2:
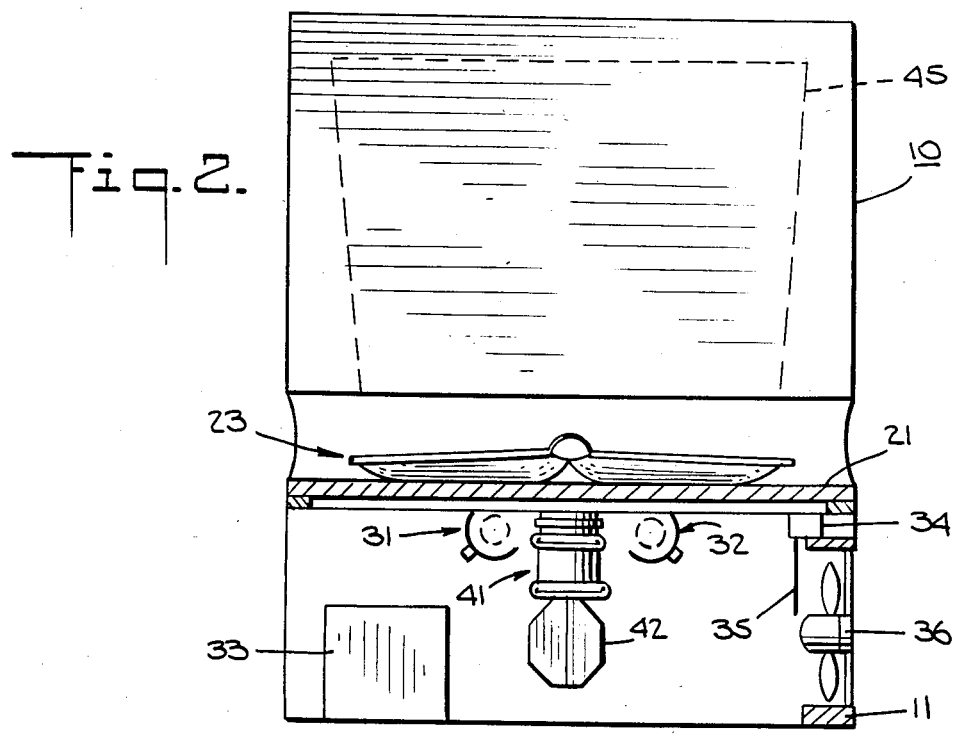
FIG. 2 shows a front elevation view, partly in section, of the device of FIG. 1.

FIG. 2 shows lamps 31 and 32 held at an angle of approximately 45 degrees to transparent pane 22 to illuminate book 23 therethrough. In the embodiment shown, the image circle is illuminated by quartz halogen reflector bulbs 31 and 32, which are provided with current from low-voltage transformer 33. Those skilled in the art will appreciate from the present disclosure that other intensity-regulating means such as SCR dimmers, variable voltage transformers, ferrite core variable inductors and the like can also be utilized. The details of the sockets and wiring are omitted for clarity.

In the embodiment shown, current from the AC lines is fed to transformer 33 through Rotron fan sail switch 34. Sail 35 of switch 34 is mounted in the output stream of fan 36 which provides a flow of air through illuminating chamber 11. Fan 36 is separately powered from the AC supply, and switch 34 is wired in series with one input lead to transformer 33 so that current to the transformer, and hence to bulbs 31 and 32, will be interrupted if fan 36 is disabled. A Dwyer pressure differential switch or other flow-sensing devices can be used to shut off the illumination if fan failure occurs.

It has been found that, with the use of two 75-watt bulbs and a glass transparent pane, the temperature of the upper surface of the glass will be a maximum of 250 degrees F. with no air circulation. However, the use of cooling fan 36 keeps the temperature much lower than this, and hence it is preferred to provide forced-air circulation for cooling of chamber 11. It will be understood that higher wattage bulbs can be used, and in this instance it is more desirable to maintain forced-air circulation. In practice, it has been found that selecting transformer 33 to provide a somewhat lower voltage than the nominal for bulbs 31 and 32 will significantly extend their lives, will reduce the heat produced, and will not appreciably lower the requisite high-contrast of the image.

The optical system of the device includes objective lens 41, Amici prism 42, a plane first-surface mirror 43, a second plane first-surface mirror 44, and rear projection screen 45. One of the advantages accruing to the device of the present invention is that a readily available high-aperture, 35 mm camera lens can be used as the objective. This has the further advantage that the diaphragm of the lens can be used to control the brightness of the image. The depth of field can also be increased by this means. Generally, the brightness obtained with the present device ranges from about 2.5 to about 400 ft-candles, which can be a considerably higher figure than obtained with prior art optical units. In one embodiment of the invention, a f/3.5 70–150 mm zoom lens has been utilized. This has the advantage of providing variable magnification as well as variable brightness. In another embodiment, a 50-mm focal length f/1.4 lens has been used. Conventional interchangeable lenses intended for use with 35-mm cameras can readily be utilized by incorporating appropriate bayonet mounts or threaded adapters. In this way, high-aperture lenses of appropriate focal lengths to provide the desired magnification can be readily obtained.

The purpose of Amici prism 42 is to deflect the image-forming rays provided by objective 41 through a 90-degree angle toward mirror 43, and at the same time to reinvert the image. It will be understood by those skilled in the art that it may be advantageous in certain embodiments to utilize two plane mirrors intersecting at 90 degrees, or other prism analog, in lieu of the Amici prism. While this requires the use of two additional first-surface mirrors, it obviates the absorption of light in the prism and the reflection of light at glass-air surfaces.

It will be observed that mirrors 43 and 44 serve to provide a folded light path for the image-forming rays and to direct the light to rear projection screen 45. Projection screen 45 is designed to control the brightness of the image perceived by the user. As such, it controls the uniformity of the transmitted illumination. This can be achieved by using a lenticular or diffuser-containing surface (not shown), desirably on the side of screen 45 toward the source of the light.

In certain embodiments of the invention, a secondary lens is inserted in the optical path. The secondary lens can be inserted either ahead of Amici prism 42, between Amici prism 42 and objective lens 41, or after objective 41. This is advantageous in certain embodiments because zoom lenses for 35 mm cameras frequently do not cover the full field of screen when these lenses are used for objective 41. The effect of this is a fall-off of illumination at the edges of the field.

When a secondary lens is utilized, it can be placed ahead of objective 41 in the optical train to alter the field of view. When the secondary objective is placed after objective 41 in the optical train, it changes the overall magnification of the system. A secondary objective may also have the effect of shortening the optical train under pane 21 so that an overall height reduction is obtained. This can be advantageous when it is desired to have a more portable unit.

It will also be appreciated from the foregoing that either or both of mirrors 43 and 44 can be carved. That is, they can be either concave or convex, in which case they can be used to alter the length of the optical path or to improve uniformity of illumination of the field of screen 45.

Figure 5:
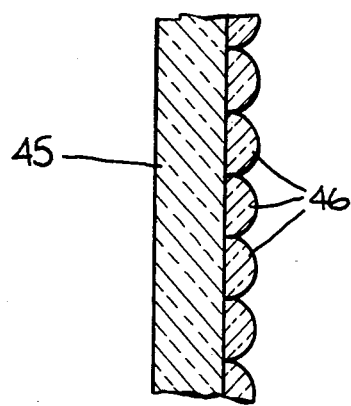
FIG. 5 shows an enlarged cross-sectional view of a portion of the viewing screen.

The control of light transmitted through screen 45 permits the use of lower intensity in lamps 31 and 32. This has the benefit of prolonging the life of the lamps and of reducing the heat which must be dissipated in the vicinity of carrier 21 and pane 22. Directionality is controlled through the use of a Fresnel configuration, a pattern of ridges 46 on screen 45, as shown in FIG. 5, with a semi-circular or approximately semi-circular cross-section so that they form in cross-section a series of small half-cylinders which act as plano-convex lenses, or by a lenticular layer which causes the light to be focused in a preferred direction. A diffusing layer is deposited on the surface of the screen as exampled by the Polacoat screen material, distributed by the 3M Company, Minneapolis, Minn.

Generally, the semi-arc of maximum illumination evenness of such directional materials is from about 10 to about 20 degrees. The directional material can be applied to screen 45 so that the maximum uniformity is normal to the surface of the screen or is at a preselected angle to the surface of screen 45. In preferred embodiments of this invention, the directional material is applied to screen 45 so that maximum uniformity is normal to the surface of the screen.

It will be observed in FIG. 1 that screen 45 is canted at an angle of about 10 degrees to the vertical. It will be appreciated from the present description by those skilled in the art that the precise positioning of screen 45 can in some embodiments be controlled by the user. Generally, screen 45 is fixed and canted 10 to 15 degrees, or even 20 degrees rearwardly when the user's eyes are well above the stage. If the user's eyes will be at or below the level of the screen, it can be constructed to be angled exactly vertically or 10 to 15 degrees toward the user. In any event, such a range of construction is considered to be substantially vertically oriented. In determining the angle of the screen, reflecting surfaces 44 and 43 are oriented to obtain maximum brightness.

It will also be noted from FIGS. 1 and 2 that screen 45 is approximately vertically above stage 21. This permits the user readily to handle the textual material and to view it.

One of the features in certain preferred embodiments of the present invention is the use of an X-Y positioner on stage 21. One positioner is the X-Y positioning mechanism sold by Microride division of Standard Precision, Inc. In use, the X-Y carrier is of great assistance to visually impaired persons and, in particular, to those who, because of age or infirmities, are unsteady and would find it difficult to move the material smoothly on the stage. Moreover, without an X-Y positioner, users tend to move the textual material diagonally, but with the carrier the lines of text are readily followed.

Figure 3:
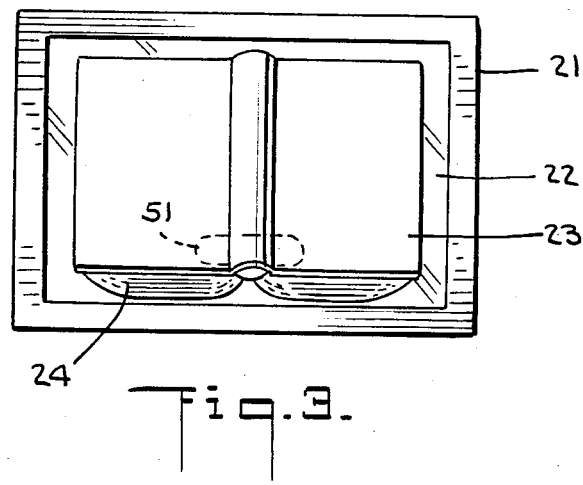
FIG. 3 shows a partial top view of one form of stage.

Turning to FIG. 3, book 23 rests with its top edge 24 toward the user. The light from bulbs 31 and 32 illuminates the textual material of book 23 through aperture 51 (shown as broken lines because this aperture is hidden by book 23).

Figure 4:
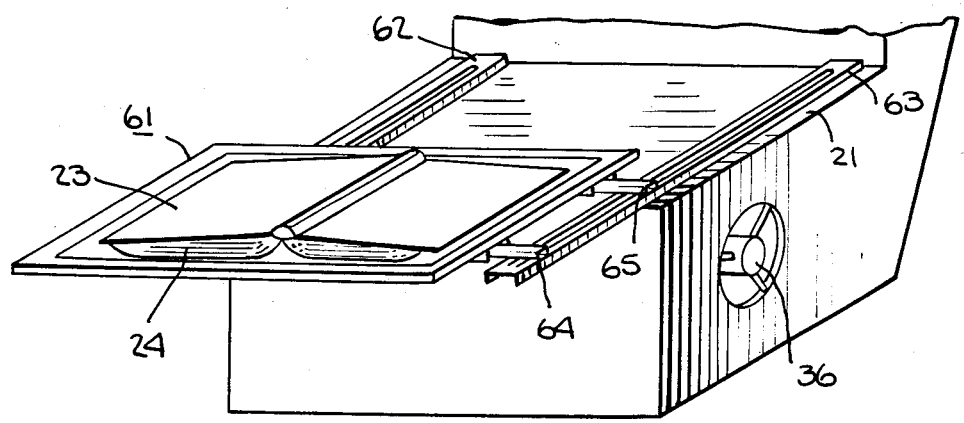
FIG. 4 shows another diagrammatic view of the X-Y positioning capability of the device of FIG. 1.

FIG. 4 is cut away above stage 21 to show the positioner feature more clearly, and the screen is accordingly not shown nor is the optical system. With the positioner moved to read matter at the lower right page of book 23, as shown in FIG. 4, light strikes the printed material, and the lens reads and projects on the screen the printed material. The X-Y positioner 61 comprises upper set of glides 62 and 63 and lower set 64 and 65. The "X" set 62 and 63 allows movement in the left-right direction, and glides 64 and 65 are the "Y" set, permitting to-and-fro movement. The bottom of the "X" glide carrier rests on top of the upper "Y" glide carrier, while the lower "Y" glide carriers are secured to tabletop 59. It has been found that a positioning carrier allows the reader to scan certainly and rapidly across a line of type or other matter with considerable facility. An initial familiarization period is helpful, and it has been found that usage of the carrier quickly becomes instinctive as the user positions the carrier to read from left to right and from top to bottom. Needless to say, the X-Y positioner can also readily be moved appropriately to read texts in languages such as Hebrew, or characters such as Kanji, which are respectively read from right to left or vertically.

What is claimed is:

1. An optical viewing device to enable a visually handicapped person to read ordinary textual material, the device comprising a substantially horizontal stage for holding the textual material; means for moving the textual material parallel to the stage; means below the stage for illuminating the material on the stage; an objective to form imaging rays and provide a real image of the material; means for both reflecting the imaging rays from the objective through substantially 90 degrees and reinverting the imaging rays; a first reflecting surface; a second reflecting surface; and a substantially vertically oriented, directional, controlled brightness rear projection viewing screen, the imaging rays from the objective successively passing from the reflecting means and the first and second surfaces to form a real erect enlarged image of the material as viewed from the front of the screen.

2. A device according to claim 1 wherein the image brightness on the screen is from about 2.5 to about 400 foot-candles.

3. A device according to claim 2 wherein the brightness is measured normal to the screen.

4. A device according to claim 1 wherein the surface of the screen initially receiving the imaging rays comprises a lenticular material.

5. A device according to claim 1 wherein the surface of the screen initially receiving the imaging rays comprises a plurality of parallel substantially semi-cylindrical transparent ridges.

6. A device according to claim 1 wherein the surface of the screen initially receiving the imaging rays comprises a Fresnel lens.

7. A device according to claim 1 wherein the image is from 5 to 30 diameters larger than the original material.

8. A device according to claim 1 wherein the reflecting surfaces are first-surface mirrors.

9. A device according to claim 1 wherein the reflecting surfaces are planar.

10. A device according to claim 1 wherein the reflecting means is an Amici prism.

11. A device according to claim 1 wherein the reflecting means is two mirrors disposed at right angles to each other.

12. A device according to claim 1 wherein the stage includes means for moving the textual material in two dimensions parallel to the stage and maintaining the material a substantially constant distance from the objective.

13. A device according to claim 1 including means for forced air cooling of the illuminating means and means for shutting off the illuminating means when the cooling means is inoperative.

14. A device according to claim 1 wherein the screen is vertically above the stage.

15. A device according to claim 1 wherein a secondary objective is used to modify the real image formed by the objective.

* * * * *